United States Patent [19]

Koenig et al.

[11] 4,024,644
[45] May 24, 1977

[54] GAUGE FOR MEASURING THE HEADSPACE IN A CONTAINER

[76] Inventors: William P. Koenig, 470 N. Powers St., Port Washington, Wis. 53074; Robert W. Ray, Jr., 4676 N. 104th St., Milwaukee, Wis. 53225

[22] Filed: Sept. 8, 1975

[21] Appl. No.: 611,217

[52] U.S. Cl. .................. 33/126.7 R; 116/118 R
[51] Int. Cl.² .................. G01F 23/00; G01F 23/04
[58] Field of Search .......... 33/126, 126.7 R, 168 R, 33/169 B; 73/290 R; 116/118 R

[56] References Cited

UNITED STATES PATENTS

| | | | |
|---|---|---|---|
| 2,053,460 | 9/1936 | Brown | 33/126.7 R |
| 2,468,833 | 5/1949 | Murphy | 73/290 R |
| 3,272,174 | 9/1966 | Pribonic | 116/118 R |

FOREIGN PATENTS OR APPLICATIONS 156,489  12/1951  Australia ................ 116/118 R Primary Examiner—Richard E. Aegerter
Assistant Examiner—Richard R. Stearns
Attorney, Agent, or Firm—Andrus, Sceales, Starke & Sawall

[57] ABSTRACT

A gauge for determining the headspace in a liquid-filled container. The gauge is composed of a flat bar of transparent material having a beveled upper horizontal edge, and a series of probes of progressively increasing length extend downwardly from the lower edge of the bar. The gauge is placed on the upper edge of a container with the probes extending downwardly into the interior of the container. Darkened spots will appear on the beveled surface above the probes that are engaged with the liquid in the container, thereby providing a precise indication of the headspace or liquid level in the container.

9 Claims, 2 Drawing Figures

U.S. Patent
May 24, 1977
4,024,644
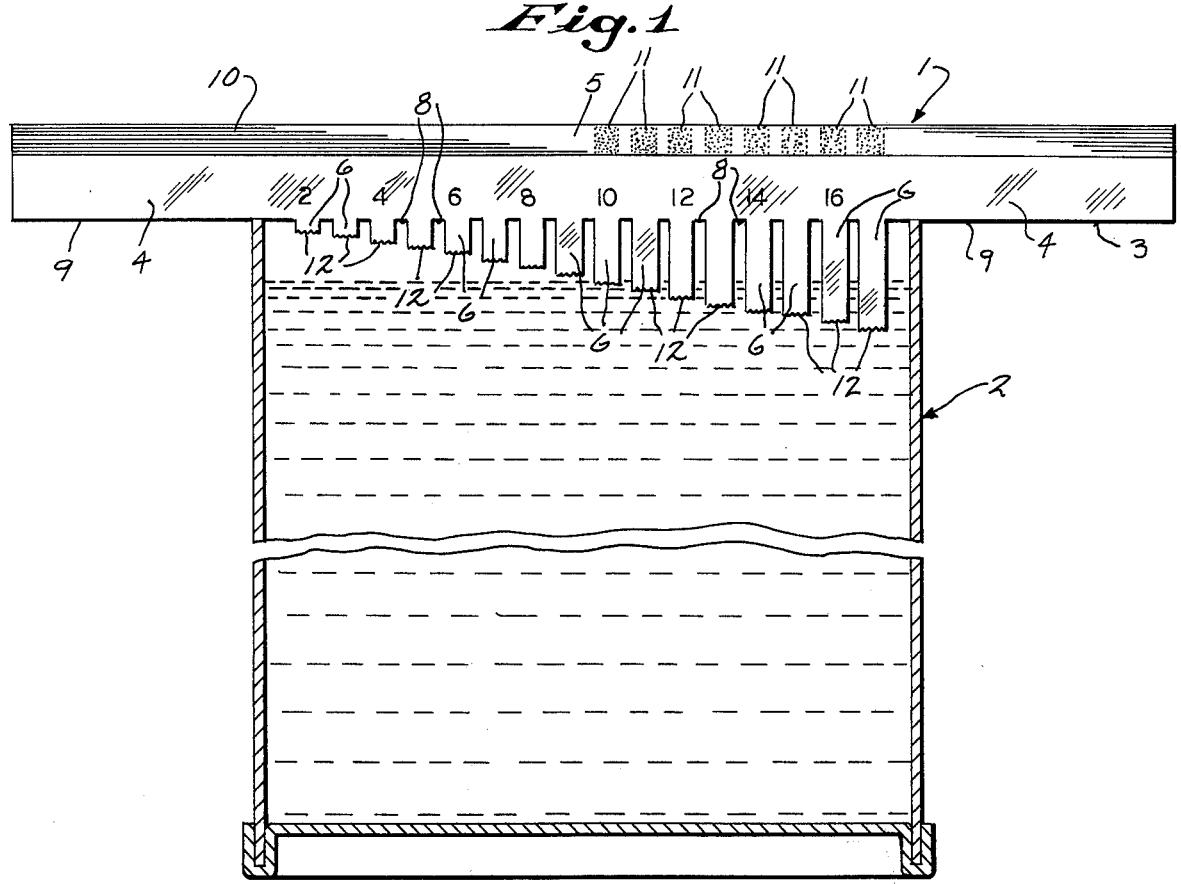
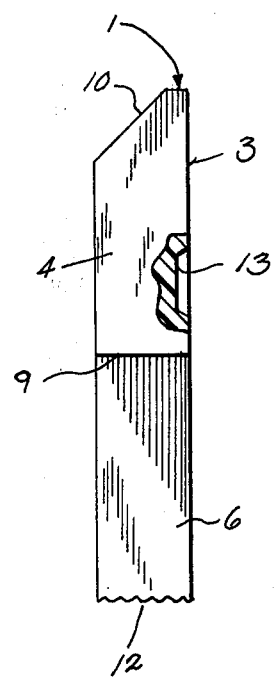

GAUGE FOR MEASURING THE HEADSPACE IN A CONTAINER

BACKGROUND OF THE INVENTION

In the canning industry, the liquid level in cans is periodically checked in production to insure that the cans are filled to the desired level with the food product. In addition, quality control personnel will occasionally remove groups of cans from the production line to check various properties of the food product, as well as checking the liquid level in the can.

In the past, a precision metal gauge has been used to check the liquid level in the cans, and the conventional gauge has been fabricated from an elongated bar having a series of probes or fingers of graduated length. The guage is placed on the top edge of the can and the operator visually determines, by looking into the can, which of the probes is at the liquid level, thus determining the headspace in the can.

The use of the metal gauge, as used in the past, has serious drawbacks in that it is difficult to visually determine which of the probes was in contact with the liquid level. Furthermore, the gauges as used in the past were relatively expensive instruments in that it was necessary to fabricate the gauge from corrosion resistant metal and the probes had to be precisely machined.

SUMMARY OF THE INVENTION

The present invention relates to an improved gauge for determining the liquid level or headspace in a container. The gauge is composed of a flat bar of transparent plastic having a beveled upper horizontal edge, and a series of probes or fingers of graduated length extend downwardly from the lower edge of the bar.

To determine the liquid level or headspace in the can, the bar is placed on the upper edge of the can with the probes extending downwardly into the interior of the can. Darkened spots will appear on the beveled surface above these probes that are engaged with the liquid, thereby providing a precise indication of the headspace in the container.

As the probes are provided with graduated lengths, usually in increments of 1/16 inch, the gauge provides a precise measurement of the headspace or liquid level in the container.

As the readings appear on the beveled surface, which is preferably at an angle of about 45°, they can be easily read, and it eliminates the necessity of the operator having to look downwardly into the can to determine the reading, as was necessary with prior type gauges.

The gauge is preferably formed of injection molded plastic, thereby providing a less expensive unit than similar gauges used in the past.

Other objects and advantages will appear in the course of the following description.

DESCRIPTION OF THE DRAWINGS

The drawings illustrate the best mode presently contemplated of carrying out the invention.

In the drawings:

FIG. 1 is a view showing the gauge being used to determine the liquid level or headspace in a container; and FIG. 2 is an end view of the gauge of the invention.

DESCRIPTION OF THE PREFERRED EMBODIMENT

The drawings illustrate the gauge 1 of the invention, which is to be used to determine the liquid level or headspace in a container or can 2.

The gauge 1 includes a flat body 3 formed of transparent material, such as plastic. The body is composed of a pair of end sections 4 and a central section 5, and a series of probes or tines 6 of graduated length extend downwardly from the central portion 5. As shown in FIG. 1, the increment or difference in length between adjacent probes is generally 1/16 inch and the probes are spaced apart a distance sufficient so that the wall of the can or container can fit between adjacent probes. As shown in FIG. 1, the edges 8 between probes lie in a common plane with the lower surfaces 9 of the end sections 4.

The upper horizontal edge 10 of the body 3 is beveled at an angle of about 45°, as shown in FIGS. 2.

To measure the liquid level or headspace in the container, the gauge is placed on the upper edge of the can as shown in FIG. 1. If the can has a relatively large diameter, the lower surfaces 9 will rest on the upper edge of the can, while in the case of a smaller can, one of the surfaces 9, as well as one of the surfaces 8 between the probes, will be supported on the upper edge of the can.

Any light entering the upper end of the transparent body 3 and travelling downwardly through a probe will be largely refracted into the liquid, if the lower end of the probe is in contact with the liquid, thereby producing a darkened spot 11 on beveled surface 10 directly above the probe. On the other hand, if the lower end of the probe is out of contact with the liquid, the incoming light will be largely reflected back upwardly in the probe so that no darkened spot will appear on beveled surface 10 above the probe.

As an example, darkened spots 11 will appear, as shown in FIG. 1, above the seven left hand probes, which are shown in that figure to be in contact with the liquid in the can.

The lower end of each probe 6 can be provided with surface irregularities, such as serrations 12, which will accentuate the darkened spots on surface 10.

Numerals 13 indicating the length of the probes can be applied to the body 3. As shown in the drawings, the numerals represent increments of 1/16 inch, and they are preferably debossed on the surface of the body 3 opposite the beveled edge 10 so that they will be reflected through the body and will be more readily visible at the surface of the body having the beveled edge. The edges of the debossments are preferably beveled at an angle of about 30° to the horizontal to increase the light refraction as well as aiding in the injection molding operation.

The gauge of the invention is a precise instrument which will give an accurate measurement of the height of the liquid or alternately, the headspace in the can. The headspace readings appear on the beveled surface 10 where they can be readily seen by the operator without the necessity of the operator peering into the interior of the can to determine which probe is in contact with the liquid, as in prior art devices.

The gauge, being made of a transparent plastic material, is non-corrosive and can be inexpensively fabricated by injection molding procedures.

Various modes of carrying out the invention are contemplated as being within the scope of the following claims particularly pointing out and distinctly claiming the subject matter which is regarded as the invention.

I claim:

1. A gauge to be supported on the upper edge of a container for determining the headspace in the container above the level of liquid therein, comprising an elongated body of transparent material having a generally flat face and having a beveled surface disposed at an acute angle to said face and extending a substantial portion of the length of the body, and a plurality of spaced probes extending downwardly in spaced relation from the body, said probes having different lengths and being spaced longitudinally from an end of the body to provide a projecting end section, the portions of the body disposed between adjacent probes being in a common plane with the lower surface of said end section, said end section adapted to rest on the upper edge of the container with the probes extending downwardly into the interior of the container, said probes and said body being formed such that under normal lighting conditions darkened spots appear on said beveled surface above the probes which are in contact with the liquid in the container.

2. The gauge of claim 1, wherein the lower end of each probe is provided with surface irregularities.

3. The gauge of claim 2, wherein said surface irregularities are serrations.

4. The gauge of claim 1, and including numerical indicia carried by said gauge to thereby indicate the length of the probes.

5. The gauge of claim 4, wherein the the body is provided with debossments representing said numerical indicia.

6. The gauge of claim 5, wherein the edges of said body bordering said debossments are beveled.

7. A gauge to be supported on the upper edge of a container for determining the headspace in the container above the level of liquid therein, comprising a body of transparent material having a base portion adapted to rest on the upper edge of the container, a series of spaced apart probes extending downwardly from the base portion and adapted to extend into the interior of the container, said probes having different lengths and disposed in a common plane, the spacing between adjacent probes being sufficient to receive the side wall of the container, and a flat elongated surface disposed on the upper portion of said body and intersecting said plane at an acute angle, said probes and said body being formed such that under normal lighting conditions darkened spots appear on said flat surface above the position of the probes that are in contact with the liquid in the container to thereby provide a visual indication of the liquid level in the container.

8. The gauge of claim 7, and including numerical indicia on said body for indicating the length of the probes.

9. The gauge of claim 7, wherein the lower end of each probe is provided with surface irregularities.

* * * * *